United States Patent Office 3,384,532
Patented May 21, 1968

---

3,384,532
PLASTICIZED POLYVINYL ACETALS CONTAINING ADMIXTURES OF THREE DIFFERENT ESTERS
Joseph G. Martins, Ludlow, and George E. Mont, Springfield, Mass., assignors, by mesne assignments, to Monsanto Company, a corporation of Delaware
No Drawing. Filed Apr. 21, 1965, Ser. No. 449,858
22 Claims. (Cl. 161—194)

ABSTRACT OF THE DISCLOSURE

Disclosed herein are plasticized poly(vinyl acetal) resins and glass laminates prepared therefrom using these plasticized resins as interlayers, which laminates exhibit improved impact strength. The plasticizers are a synergistic mixture of (1) a non-polymeric ester; (2) a liquid polyester; and (3) an ester which is the coreaction product of a disaccharide and at least one organic carboxylic acid.

---

This invention relates to plasticized acetals. More particularly, the invention relates to improved polyvinyl butyral compositions comprising a combination of plasticizers and an ester having a synergistic effect which results in improved properties and to sheets and laminates made therefrom.

Acetals especially polyvinyl butyral have been used for years as interlayers in the preparation of laminated glass structures for use in windshields of vehicles and aircraft, structural members in building construction, glass doors, decorative partitions, table tops, etc. Such interlayers must have high impact strength in order to resist blows from moving objects and sufficient adhesion to the glass members of the laminate so as to minimize the danger from flying glass after impact. In uses where there is a danger of a person striking the laminate, e.g., walking into glass doors and partitions, hitting the windshield after the vehicle comes to a sudden stop, etc., the laminate serves to minimize the hazard of the person penetrating the laminate as well as being cut by flying glass. Polyvinyl butyral alone is not suitable over a wide temperature range for use as an interlayer in glass laminates and must be plasticized in order to achieve suitable low temperature properties such as flexibility and adhesion to glass.

However, a problem arises with the use of plasticizers. Plasticizers cause a decrease in impact strength and tensile strength of the interlayer and in the resulting laminates especially at higher temperatures. A definite need exists for a plasticized polyvinyl butyral sheet which has improved tensile and impact strength over a broader temperature range in order to meet safety requirements for laminates used at temperatures above 70° F. These uses would include automobile windshields where the temperature can rise to 140° F. during summer months or in architectural uses where the laminate is exposed to strong sunlight and heat.

One object of this invention is to provide a composition of matter comprising acetals, plasticizers and an ester having improved physical properties.

A second object is to set forth a process for preparing a composition of acetals, plasticizers and an ester having improved physical properties.

A third object is to provide sheets prepared from a plasticized polyvinyl acetal having improved properties.

A fourth object is to provide laminates having improved physical properties.

A fifth object is to provide plasticizer systems, containing an ester which is the coreaction product of a disaccharide and at least one organic acid, having a synergistic effect for incorporation into polyvinyl acetal resins.

These and other objects are attained by combining a polyvinyl acetal resin with:

(1) At least one ester having a boiling point greater than 175° C., selected from the group consisting of partial and full esters of (1) an alcohol containing at least one hydroxyl group and (2) an acid containing at least one carboxyl group.
(2) At least one liquid polyester having a molecular weight in the range of 500–50,000 and which is a coreaction product of a polybasic acid and a polyhydric alcohol.
(3) At least one ester which is the coreaction product of a disaccharide and an organic acid.

The following examples are given in illustration and are not intended as limitations on the scope of this invention. Where parts are mentioned they are parts by weight.

Examples I to VIII are intended to show the synergistic effect of the plasticizers and the ester by demonstrating the poorer results obtained when the liquid polyester or the disaccharide ester is omitted and to demonstrate the wide range in proportions of the ternary combination of esters which are equally useful in the practice of this invention.

EXAMPLE I 100 parts of a polyvinyl butyral resin, having a molecular weight in the range of 180,000–270,000, a residual hydroxyl content in the range of 17.5–22.5% and less than 3% residual vinyl acetate groups is plasticized with:

(1) 35 parts of triethylene glycol di(2-ethyl butyrate).
(2) 5 parts of a liquid polyester of diglycolic acid and propylene glycol, said polyester being terminated by butyl Cellosolve and having a molecular weight of approximately 3000.
(3) 10 parts of sucrose benzoate having the general formula $$C_{12}H_{14}O_3(C_6H_5-COO)_{7.4 \text{ average}}$$

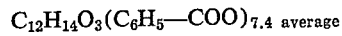

by intimately blending the ingredients in a Brabender plastograph for 20 minutes at 150° C. and 30 r.p.m.

The resultant plasticized resin is then pressed for 2–3 minutes at 5000 p.s.i. and 165° C. to form sheets or films approximately 20 mils thick. The terms sheets and films are used interchangeably in this invention and one is not to be construed as limiting on the other. These films are used in tensile tests and made into glass laminates for impact tests. The glass laminates for impact tests are prepared by placing the pressed film between circular glass plates which are about ⅛ inch thick and 3⅞ inches in diameter and then pressing the laminates at 150° F. for 3–5 minutes. Shims are used to obtain an interlayer thickness of about 15 mils.

The free films used in the impact tests are prepared by casting the plasticized resin from a 15% methanol solution. These films and those used in the tensile tests are stored at 23° C.±1° and 50% R.H.±1% for 24 hours before testing.

Tests (1) Tensile tests (ASTM D–638–58T) are run on an Instron tester using C cell, 20 i.p.m. cross head, 10 i.p.m. chart speed, 2 inch gauge length, and a load range of 50 pounds. Tensile is reported in pounds per square inch.

(2) Impact test on free films: The free films are placed between the members of a temperature gradient bar wherein a series of superimposed holes have been drilled through the members of said gradient bar. A steel plunger having a diameter of .047 inch is placed in a hole and a steel ball weighing 3.51 grams is dropped through a tube onto the plunger from a height of four feet. A temperature gradient ranging from 150° F. to 220° F.

is achieved along the nine inches of the test portion of the bar. The temperature gradient is achieved by immersing one end of the bar in an isopropanol Dry Ice bath and by attaching a Chromalox strip heater at the other end. The test is designed to measure the temperature range at which peneration of the film results after impact.

(3) Impact tests on glass laminates: A one pound steel ball, 2 inches in diameter, is dropped through a tube onto the laminate from a height of 63 inches. The laminate is supported around its periphery by a pipe 2½ inches in diameter in such a manner as to allow the ball to penetrate the laminate in such cases where penetration may occur.

Test results are tabulated in Table I.

EXAMPLE II 100 parts of a polyvinyl butyral resin and 40 parts of triethylene glycol di(2-ethyl butyrate) are blended and formed into films and laminates according to the method of Example I. The resultant film has poorer tensile and impact strength and the laminate prepared therefrom split into three pieces on impact as may be seen by the results in Table I.

EXAMPLE III 100 parts of a polyvinyl butyral resin, 40 parts of triethylene glycol di(2-ethyl butyrate) and 2 parts of a liquid polyester of diglycolic acid and propylene glycol, said liquid polyester being terminated with butyl Cellosolve end groups and having a molecular weight of approximately 3000 are blended and formed into films and laminates according to the method set forth in Example I. The superior impact properties of this blend as compared to those of Example II are illustrated in Table I, however, the film is cloudy and hazy and unacceptable where clear laminates are essential.

EXAMPLE IV 100 parts of a polyvinyl butyral resin, 40 parts of triethylene glycol di(2-ethyl butyrate) and 5 parts of sucrose benzoate are blended and formed into films and laminates according to the method set forth in Example I. The inferior physical properties of this blend as compared to those of the synergistic mixture of Example I are listed in Table I.

EXAMPLE V 100 parts of a polyvinyl butyral resin, 40 parts of triethylene glycol di(2-ethyl butyrate), 3 parts of a polyester of diglycolic acid and propylene glycol, said polyester being terminated by butyl Cellosolve and having a molecular weight of about 3000, and 5 parts of sucrose benzoate are blended and formed into films and laminates according to the method set forth in Example I. Test results are listed in Table I.

EXAMPLE VI 100 parts of a polyvinyl butyral resin, 40 parts of triethylene glycol di(2-ethyl butyrate), 2 parts of a polyester of diglycolic acid and propylene glycol, said polyester being terminated by butyl Cellosolve and having a molecular weight of about 3000, and 4 parts of sucrose benzoate are blended and formed into films and laminates according to the method set forth in Example I. Test results are listed in Table I.

EXAMPLE VII 100 parts of a polyvinyl butyral resin, 40 parts of triethylene glycol di(2-ethyl butyrate), 0.5 part of a polyester of diglycolic acid and propylene glycol, said polyester being terminated by butyl Cellosolve and having a molecular weight of about 3000, and 1.0 part of sucrose benzoate are blended and formed into films and laminates according to the method set forth in Example I. Test results are listed in Table I.

EXAMPLE VIII 100 parts of a polyvinyl butyral resin, 40 parts of triethylene glycol di(2-ethyl butyrate), 0.5 part of a polyester of diglycolic acid and propylene glycol, said polyester being terminated by butyl Cellosolve and having a molecular weight of about 3000, and 0.5 part of sucrose benzoate are blended and formed into films and laminates according to the method set forth in Example I. Test results are listed in Table I.

TABLE I

| Example | Parts of Plasticizer per hundred parts of Acetal A/B/C | Free Film | | Glass Laminate [3] | |
|---|---|---|---|---|---|
| | | Tensile [1] | Impact Temp. Range [2] (° F.) | Clarity [4] | Test Results |
| I | 35/5/10 | 4,100 | 195-205 | Clear | No delamination, interlayer intact. |
| II | 40/0/0 | 3,530 | 156/160 | do | No delamination, laminate split into 3 pieces. |
| III | 40/2/0 | 3,600 | 164-170 | Hazy | 2-4% delamination at impact point. Interlayer intact. |
| IV | 40/0/5 | 3,490 | 154-158 | Clear | No delamination, laminate split into 3 pieces. |
| V | 40/3/5 | 3,300 | 167-170 | do | 2-4% delamination at impact point, interlayer intact. |
| VI | 40/2/4 | 3,510 | 163-168 | do | 1-2% delamination at impact point, interlayer intact. |
| VII | 40/0.5/1.0 | 3,540 | 156-160 | do | Do. |
| VIII | 40/0.5/0.5 | 3,500 | 156-160 | do | No delamination, no penetration. |

[1] Values in p.s.i.
[2] Initiation of 50% failures.
[3] Laminates vary from 0.186 to 0.194 inches thick; no delamination indicates good adhesion of interlayer to glass; interlayer intact indicates superior strength of interlayer.
[4] As viewed under ultraviolet light.
A = Major component plasticizer.
B = Liquid polyester plasticizer.
C = Ester which is the coreaction product of disaccharide and an organic acid.

Examples IX to XVIII are set forth to illustrate the wide variety of plasticizers and esters which are used in the practice of this invention.

EXAMPLE IX 100 parts of a polyvinyl butyral resin, 40 parts of butoxy-ethoxy ethyl butyrate, 0.5 part of a polyester of diglycolic acid and propylene glycol, said ployester being terminated by butyl Cellosolve and having a molecular weight of about 3000, and 0.5 part of sucrose acetate isobutyrate are blended and formed into films and laminates according to the method set forth in Example I, with equivalent results.

EXAMPLE X 100 parts of a polyvinyl butyral resin, 40 parts of diethyl succinate, 1 part of a polyester of diglycolic acid and propylene glycol, said polyester being terminated by butyl Cellosolve and having a molecular weight of about 3000, and 1 part of sucrose acetate are blended and formed into films and laminates according to the method set forth in Example I, with equivalent results.

EXAMPLE XI 100 parts of a polyvinyl butyral resin, 40 parts of triethylene glycol di(2-ethyl butyrate), 2 parts of a polyester of adipic acid and propylene glycol having a molecular weight of about 3000, and 2 parts of maltose benzoate are blended and formed into films and laminates according to the method set forth in Example I with equivalent results.

EXAMPLE XII 100 parts of a polyvinyl butyral resin, 40 parts of butyl ricinoleate, 4 parts of a polyester of diglycolic acid and pentamethylene glycol having a molecular weight of about 5000 and 2 parts of an ester prepared from sucrose, 3 mols of monochloroacetic acid and 5 mols of benzoic acid are blended and formed into films and laminates according to the method set forth in Example I with equivalent results.

EXAMPLE XIII

Equivalent results are obtained when repeating Example XII only substituting sucrose acetate isobutyrate for sucrose monochloroacetate benzoate.

EXAMPLE XIV 100 parts of a polyvinyl butyral resin, 45 parts of triethylene glycol di(2-ethyl butyrate), 5 parts of a polyester of diglycolic acid and propylene glycol, said poyester being terminated by butyl Cellosolve and having a molecular weight of about 3000, and 20 parts of sucrose isobutyrate are blended and formed into films and laminates according to the method set forth in Example I with equivalent results.

EXAMPLE XV 100 parts of a polyvinyl butyral resin, 25 parts of dibutyl Cellosolve adipate, 5 parts of a polyester of adipic acid and diethylene glycol having a molecuar weight of about 1500 and 10 parts of sucrose benzoate are blended and formed into films and laminates according to the procedure set forth in Example I with equivalent results.

EXAMPLE XVI 100 parts of a polyvinyl butyral resin, 25 parts of phenyl oleate, 5 parts of a polyester wherein the diacid portion is prepared from the etherification of alpha-hydroxy-n-butyric acid and the polyhydric portion is tetraethylene glycol, said polyester having a molecular weight of 5000, and 10 parts of lactose benzoate are blended and formed into sheets and laminates according to the method of Example I, with equivalent results.

EXAMPLE XVII 100 parts of a polyvinyl butyral resin, 30 parts of glyceryl mono-oleate, 8 parts of a polyester wherein the diacid portion is prepared from the etherification of alpha-hydroxy propionic acid and the polyhydric portion is 1,3-propanediol, said polyester having a molecular weight of 7,000 and 15 parts of lactose acetate isobutyrate are blended and formed into sheets and laminates according to the method of Example I, with equivalent results.

EXAMPLE XVIII 95 parts of a polyvinyl butyral resin, having a molecular weight in the range of 150,000 to 270,000, a residual hydroxyl content in the range of 15 to 25% and less than 3% residual polyvinyl ester groups, 5 parts of a polyvinyl formal resin having a molecular weight in the range of 15,000 to 40,000, a residual hydroxyl content of 3 to 12% and a residual polyvinyl ester content in the 5 to 55% range, 60 parts of tricresyl phosphate, 20 parts of a polyester of diglycolic acid and 1,3-butanediol, and 20 parts of sucrose benzoate are blended and formed into sheets and laminates according to the method of Example I, with equivalent results.

Table I illustrates the synergistic effect achieved with the combination of plasticizers and also the wide range of proportions that are possible. The impact temperature range increases with increasing amount of polyester type plasticizer and cloudiness results when the ester which is the coreaction product of a disaccharide and an organic acid is omitted. The glass laminates of Examples II and IV, which contained no polyester plasticizer, have very poor impact strength.

The polyvinyl acetal resins which are employed in the present invention may be made from various unsubstituted ketones containing an active carbonyl group or from mixtures of unsubstituted aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be utilized. In general, the acetal resin is made by reacting an aldehyde with hydrolyzed polyvinyl ester wherein the carboxylic moiety is derived from an aliphatic acid of from 1 to 8 carbon atoms such as formate, acetate, propionate, butyrate, 2-ethylhexylate, etc. in the presence of a solvent for the product and precipitating the resin product with water. Alternate methods might include carrying out the reaction in the presence of a non-solvent dispersing medium such as water or a non-solvent mixture of water and solvent, e.g., a water-ethanol mixture. More detailed methods for preparing such resins are set forth in Morrison et al. U.S. Patent No. Re. 20,430, dated June 29, 1937, and Lavin et al. U.S. Patent No. 2,496,480. In general, polyvinyl acetal resins made from saturated lower unsubstituted aliphatic aldehydes are the most suitable. These would include polyvinyl acetal resins made from unsubstituted saturated aliphatic aldehydes containing less than 6 carbon atoms and especially those made from formaldehyde, acetaldehyde, butyraldehyde and mixtures thereof. Particularly preferred are polyvinyl acetal resins made from butyraldehyde.

In general the polyvinyl acetal resins employed have Staudinger molecular weights ranging from about 50,000 to 600,000 and preferably from 150,000 to 270,000 and may be considered to be made up, on a weight basis, of from 5 to 25% hydroxyl groups, calculated as polyvinyl alcohol, 0 to 40% ester, and preferably acetate, groups, calculated as polyvinyl ester, e.g., acetate, and the balance substantially acetal. When the acetal is butyraldehyde acetal, the polyvinyl acetal resin will preferably contain, on a weight basis, from 16 to 25% hydroxyl groups, calculated as polyvinyl alcohol and from 0 to 3% ester, e.g., acetate, groups, calculated as polyvinyl ester, the balance being substantially butyraldehyde acetal.

The plasticizers which may be used as the major plasticizer component in preparing polyvinyl acetal compositions in the practice of this invention are esters of an alcohol which contains at least one hydroxyl group and an acid which contains at least one carboxyl group. Among the suitable plasticizers are triethylene glycol di(2-ethyl butyrate), triethylene glycol dihexoate, glyceryl mono-oleate, di(butoxyethyl)adipate, dialkyl phthalates, i.e., dioctyl phthalate, dibutoxy ethyl phthalate, dibutyl Cellosolve adipate, butyl ricinoleate, alkyl laurates, dibutyl diglycolate, diamyl phthalate, mono and dialkyl succinates, triethylene glycol dibutyrate, tributyl citrate, triaryl phosphates, butoxy-ethoxy ethyl butyrate, diethoxy ethyl phthalate, triethylene glycol dipropionate, diethylene glycol dipropionate, benzoxyethoxy ethyl propionate, mono and dialkyl sebacates, butyl benzoate, diglycerol tetracetate, dialkoxy alkyl sebacic acid esters, di(polyglycol monoether) esters of sebacic acid, di(ethyl ether of diethylene glycol)sebacate, di(butyl ether of diethylene glycol)sebacate, di(tetrahydrofurfuryl)sebacate, tetrahydrofurfuryl oxalate, tetrahydrofurfuryl, tetrahydrofuroate, glyceryl alpha-gamma dialkyl ethers, dialkyl esters of diglycolic and thiodiglycolic acids, aryl esters of higher aliphatic acids such as phenyl oleate, phenyl abietate, etc. When desired, mixtures of these and other types of plasticizers may also be included in the compositions, examples of which are well known to those skilled in the art. Particularly preferred are partial ester plasticizers which are esters of glycerin made with aliphatic carboxylic acids containing ethylenic unsaturation having from 10 to 22 carbon atoms. Examples of acids from which these esters may be made include monoolefinic unsaturated aliphatic acids such as 7-hexadecenoic acid, 10-undecenoic acid, 13-docosenoic acid, and 9-octadecenoic acid; diolefinic-unsaturated aliphatic acids such as 9,12-octadecadienoic acid; triolefinic-unsaturated aliphatic acids such as 9,12,15-octadecatrienoic acid, 9,11,13-octadecatrienoic acid; substituted olefinic acids, for example, such hydroxy olefinic acids as 16-hydroxy-7-hexadecenoic acid and 12-hydroxy-9-ocadecenoic acid, halogenated unsaturated acids, for example, monochloro-9-octadecenoic acid, monochloro-12-hydroxy-9-octadecenoic acid and halogenated acids derived by dehydration of castor oil acids followed by chlorination. In addition, mixtures of the foregoing glyceryl esters of unsaturated aliphatic acids may be employed and when desired, mixtures of the foregoing unsaturated esters with glyceryl esters of saturated aliphatic acids, as for example, esters derived from the mixtures of acids occurring in various oils, as for example, linseed, castor, tung, soya bean, perilla, corn, cotton seed, sunflower, safflower, sesame, poppy seed, walnut, peanut, olive, rapeseed, whale and dehydrated castor oils. For certain purposes, partial esters may be used which are made of the mixtures of acids occurring in oils such as palm kernel oil, cocoanut oil, and the like, which mixtures of acids contain substantial amounts of unsaturated acids such as those mentioned above, but do not predominate therein.

The amount of the major plasticizer component to be added to the polyvinyl acetal resin may be varied within wide limits in order to prepare compositions having different initial viscosities and mixtures containing from about 1 to 95 parts of major plasticizer component per 100 parts of polyvinyl acetal resin may be used with satisfactory results. However, for general safety laminate use, the major plasticizer component content should be between 5 to 60 parts per 100 parts of polyvinyl acetal resin and more preferably 10 to 50 parts per 100 parts of polyvinyl acetal resin.

Normally polyester plasticizers are not used for polyvinyl acetals because of the incompatibiltiy of the two resins. This incompatibility manifests itself in such various ways as exudation of the plasticizer, cloudiness, streakiness, grains and grits in the plasticized resin. However, surprisingly enough, this invention teaches a method for incorporating a normally incompatible polyester plasticizer into a polyvinyl butyral resin. This results in a synergistic combination of plasticizers which will be explained in greater detail later. Thus, one may gain the advantages of polyester plasticizers, greater impact strength for example, without suffering their disadvantages.

For the purposes of this invention any suitable liquid polyester plasticizer may be used in preparing the polyvinyl acetal compositions. In general, the liquid polyester plasticizers which are commonly employed are polyesters of a dibasic acid and a polyhydric alcohol. The acid portion is preferably any dicarboxylic acid containing from 2 to 22 carbon atoms such as oxalic, malonic, succinic, glutaric, adipic, pimelic, suberic, azelaic, sebacic, unidecanedioic, dodecanedioic, tridecanedioic, tetradecanedioic, pentadecanedioic, hexadecanedioc, heptadecanedioic, octadecanedioic, nonodecanedioic. More preferably one would use a dicarboxylic acid of from 4–18 carbons.

Even better results are obtained when one uses a dicarboxylic acid which also contains one or more ether linkages such as in diglycolic acid, for example. Suitable other dicarboxylic acids which contain ether linkage include the symmetrical or unsymmetrical dicarboxylic acid ethers of alpha-hydroxy acids such as alpha-hydroxy acetic, alpha-hydroxy propionic, alpha-hydroxy-n-butyric, alpha-hydroxy isobutyric, alpha-hydroxy-n-valeric, alpha-hydroxy isovaleric, alpha-hydroxy methyl ethylacetic, alpha-hydroxy caproic, alpha-hydroxy heptoic, alpha-hydroxy caprylic, alpha-hydroxy pelargonic, alpha-hydroxy capric, alpha-hydroxy undecyclic, alpha-hydroxy lauric, alpha-hydroxy tridecylic, alpha-hydroxy myristic, alpha-hydroxy pentadecyclic, alpha-hydroxy pamitic, alpha-hydroxy magaric, alpha-hydroxy stearic, alpha-hydroxy monodecyclic, alpha-hydroxy arachidic.

The advantage in using dicarboxylic acids which contain ether linkages arises because of the greater flexibility of the polymer chains which contain oxygen atoms in the backbone. This flexibility has been found to result in greater impact strength in the resin interlayer and in the final laminate.

Any suitable polyhydric alcohol may be used as the alcohol portion of the liquid polyester. In general, the polyhydric alcohols which are commonly used include ethylene glycol, diethylene glycol, triethylene glycol, polyethylene glycol, 1,2-propanediol, 1,3-propanediol, 1,2-butanediol, 1,3-butanediol, 1,4-butanediol, 2,3-butanediol, pentamethylene glycol, hepamethylene glycol, glyceryl monochlorohydrin. The particular compounds set forth are meant to be illustrative and do not necessarily encompass all possible polyhydric alcohols. The same principle of increased flexibility in the chain backbone which was discussed in the acid portion is also applicable here.

The molecular weight range of these liquid polyesters may be varied within wide limits depending on the dicarboxylic acid and polyhydric alcohol used and the particular properties desired. However, for general safety glass laminate use the molecular weight range should be between 300 and 50,000 and more preferably between 1000 and 20,000.

The amount of liquid polyester plasticizer to be added to the polyvinyl acetal resin may be varied within wide limits in order to prepare compositions having different degrees of tensile strength, temperature impact range and clarity. In general the polyester serves to increase the tensile strength and temperature impact range of the free film and of the laminate. However, adhesion to the glass decreases as the amount of polyester increases. For the purposes of this invention 0.5 to 20 parts of polyester plasticizer per hundred parts of polyvinyl acetal resin may be used with satisfactory results, and preferably from 0.5 to 10 parts of polyester plasticizer per hundred parts of polyvinyl acetal resin.

As was pointed out above, liquid polyester plasticizers are normally incompatible with polyvinyl butyral resins. However, it was discovered that liquid polyesters could be used as plasticizers for polyvinyl acetal resins if a compound, which is the coreaction product of a disaccharide and at least one organic acid, is added to the system. The resulting synergism has been found to render the polyester and the polyvinyl butyral compatible and improves the tensile and high impact strength of the free film and improves the glass laminate properties. The role of this coreaction product of a disaccharide and an organic acid, appears to be that of a compatibilizing agent and does not seem to affect tensile or impact strength.

The disaccharide moiety of the coreaction product may be any disaccharide such as lactose, maltose, sucrose, melibiose, cellobiose, and trehalose. Preferably, one would use sucrose.

The acid moiety should be derived from at least one organic acid containing from 1 to 10 carbon atoms. Examples of such acids include formic, acetic, propionic, butyric, isobutyric, pentanoic, hexanoic, heptanoic, octanoic, nonanoic, decanoic, benzoic, phenylacetic, chlorobenzoic, p-toluic, phenylpropionic, and monochloroacetic acids. Preferably, one would use benzoic acid or a mixture of acetic and isobutyric acids.

The preferred reaction product is one where an average of at least three of the available hydroxyl groups of the disaccharide have been esterified and more preferably where seven or eight of the hydroxyl groups have been esterified.

The amount of this disaccharide ester used may be varied within wide limits depending on the properties desired within the final product, and the degree of incompatibility that can be tolerated. This depends on the product and its intended use.

For example, exudation of plasticizer is generally unacceptable in any application, while grains, grits and streaking may be permissible in laminates where the outer layers are opaque. Furthermore, glass laminates used in windshields of vehicles must, of necessity, be free from any of the above mentioned defects but some degree of haze or cloudiness may be acceptable in some architectural glass laminates, especially those of the tinted or translucent variety.

The preferred ester would be sucrose benzoate or sucrose acetate isobutyrate wherein the molar ratio of acetate to isobutyrate may vary from 1/7 to 7/1.

In general, 0.5 to 60 parts of the disaccharide ester per hundred parts of polyvinyl acetal resin may be used. More preferably from 0.5 to 25 parts of the disaccharide ester per hundred parts of polyvinyl acetal resin may be used.

Compositions containing the materials used in this invention may be modified by the incorporation of conventional additives such as dye stuffs, pigments, fillers, extenders, stabilizers, lubricants, etc.

It is obvious that many variations may be made in the compositions, sheets, laminates and processes set forth above without departing from the spirit and scope of this invention. Thus, it is intended that all matter contained in the above description shall be interpreted as illustrative and not in a limiting sense.

What is claimed is:
1. A composition of matter comprising a polyvinyl acetal resin containing:
   (A) At least one non-polymeric ester having a boiling point greater than 175° C. selected from the group consisting of partial and full esters of (1) an alcohol which contains at least one hydroxyl group and (2) an acid which contains at least one carboxyl group,
   (B) At least one liquid polyester having a molecular weight in the range of 300 to 50,000 and which is the coreaction product of a polybasic acid and a polyhydric alcohol, and
   (C) At least one ester which is the coreaction product of a disaccharide and at least one organic carboxylic acid, containing from 1 to 10 carbon atoms.
2. The composition as set forth in claim 1 wherein the polyvinyl acetal is polyvinyl butyral.
3. A composition of matter comprising a polyvinyl acetal resin containing:
   (A) 1 to 95 percent, based on the weight of the polyvinyl acetal, of at least one non-polymeric ester having a boiling point greater than 175° C., selected from the group consisting of partial or full esters of (1) an alcohol containing at least one hydroxyl group and (2) an acid containing at least one carboxyl group,
   (B) 0.5 to 20 percent, based on the weight of the polyvinyl acetal, of at least one liquid polyester having a molecular weight in the range of 300 to 50,000, and which is the coreaction product of a polyhydric alcohol and a polybasic acid, and
   (C) 0.5 to 60 percent, based on the weight of the polyvinyl acetal, of at least one ester which is the coreaction product of a disaccharide and at least one organic carboxylic acid, containing from 1 to 10 carbon atoms.
4. The composition as set forth in claim 2 wherein the polyvinyl acetal resin is polyvinyl butyral.
5. A composition of matter comprising a polyvinyl butyral resin containing:
   (A) 1 to 95 percent, based on the weight of the polyvinyl butyral, of triethylene glycol di(2-ethyl butyrate),
   (B) 0.5 to 20 percent, based on the weight of the polyvinyl butyral, of at least one liquid polyester having a molecular weight in the range of 300 to 50,000 and which is the coreaction product of a polyhydric alcohol and a polybasic acid, and
   (C) 0.5 to 60 percent, based on the weight of the polyvinyl butyral, of at least one ester which is the coreaction product of a disaccharide and at least one organic carboxylic acid, containing from 1 to 10 carbon atoms.
6. A composition of matter comprising a polyvinyl butyral resin containing:
   (A) 1 to 95 percent, based on the weight of the polyvinyl butyral, of at least one non-polymeric ester having a boiling point greater than 175° C. selected from the group consisting of partial or full esters of (1) an alcohol containing at least one hydroxyl group and (2) an acid containing at least one carboxyl group,
   (B) 0.5 to 20 percent, based on the weight of the polyvinyl butyral, of a liquid polyester of diglycolic acid and propylene glycol, said polyester being terminated by butyl Cellosolve, and
   (C) 0.5 to 60 percent, based on the weight of the polyvinyl butyral, of at least one ester which is the coreaction product of a disaccharide and at least one organic carboxylic acid, containing from 1 to 10 carbon atoms.
7. A composition of matter comprising a polyvinyl butyral resin containing:
   (A) 1 to 95 percent, based on the weight of the polyvinyl butyral, of at least one non-polymeric ester having a boiling point greater than 175° C., selected from the group consisting of partial or full esters of (1) an alcohol containing at least one hydroxyl group and (2) an acid containing at least one carboxyl group,
   (B) 0.5 to 20 percent, based on the weight of the polyvinyl butyral, of at least one liquid polyester having a molecular weight in the range of 300 to 50,000, and which is the coreaction product of a polyhydric alcohol and a polybasic acid, and
   (C) 0.5 to 60 percent, based on the weight of the polyvinyl butyral, of sucrose benzoate.
8. A process for preparing a composition of matter which comprises comalaxating a polyvinyl acetal resin with:
   (A) At least one non-polymeric ester having a boiling point greater than 175° C., selected from the group consisting of partial and full esters of (1) an alcohol containing at least one hydroxyl group and (2) an acid containing at least one carboxyl group,
   (B) At least one liquid polyester having a molecular weight in the range of 300 to 50,000, and which is the coreaction product of a polybasic acid and a polyhydric alcohol, and
   (C) At least one ester which is the coreaction product of a disaccharide and at least one organic carboxylic acid, containing from 1 to 10 carbon atoms.
9. A process as set forth in claim 8 wherein the polyvinyl acetal is polyvinyl butyral.
10. A process for preparing a composition of matter by comalaxating a polyvinyl butyral resin with:
   (A) 1 to 95 percent, based on the weight of the polyvinyl butyral, of at least one non-polymeric ester having a boiling point greater than 175° C., selected from the group consisting of partial and full esters of (1) an alcohol containing at least one hydroxyl group and (2) an acid containing at least one carboxyl group,
(B) 0.5 to 20 percent, based on the weight of the polyvinyl butyral, of at least one liquid polyester having a molecular weight in the range of 300 to 50,000, and which is the coreaction product of a polyhydric alcohol and a polybasic acid, and
(C) 0.5 to 60 percent, based on the weight of the polyvinyl butyral, of at least one ester which is the coreaction product of a disaccharide and at least one organic carboxylic acid, containing from 1 to 10 carbon atoms.

11. A process for preparing a composition of matter which comprises comalaxating a polyvinyl acetal resin with:
(A) 1 to 95 percent of triethylene glycol di(2-ethyl butyrate) based on the weight of the polyvinyl acetal,
(B) 0.5 to 20 percent of a liquid polyester of diglycolic acid and propylene glycol, said liquid polyester being terminated by butyl Cellosolve, based on the weight of the polyvinyl butyral, and
(C) 0.5 to 60 percent of sucrose benzoate based on the weight of the polyvinyl butyral.

12. A sheet comprising a polyvinyl acetal resin consisting of:
(A) At least one non-polymeric ester having a boiling point greater than 175° C. selected from the group consisting of partial and full esters of (1) an alcohol containing at least one hydroxyl group and (2) an acid containing at least one carboxyl group,
(B) At least one liquid polyester having a molecular weight in the range of 300 to 50,000 and which is the coreaction product of a polybasic acid and a polyhydric alcohol, and
(C) At least one ester which is the coreaction product of a disaccharide and at least one organic carboxylic acid, containing from 1 to 10 carbon atoms.

13. A sheet as set forth in claim 12 wherein the polyvinyl acetal is polyvinyl butyral.

14. A sheet comprising a polyvinyl acetal resin consisting of:
(A) 1 to 95 percent, based on the weight of the polyvinyl acetal, of at least one non-polymeric ester having a boiling point greater than 175° C., selected from the group consisting of partial or full esters of (1) an alcohol containing at least one hydroxyl group and (2) an acid containing at least one carboxyl group,
(B) 0.5 to 20 percent, based on the weight of the polyvinyl acetal, of at least one liquid polyester having a molecular weight in the range of 300 to 50,000, which is the coreaction product of a polyhydric alcohol and a polybasic acid, and
(C) 0.5 to 60 percent, based on the weight of the polyvinyl acetal, of at least one ester which is the coreaction product of a disaccharide and at least one organic carboxylic acid, containing from 1 to 10 carbon atoms.

15. A sheet comprising a polyvinyl butyral resin consisting of:
(A) 1 to 95 percent of triethylene glycol di(2-ethyl butyrate) based on the weight of the polyvinyl butyral,
(B) 0.5 to 20 percent of a liquid polyester of diglycolic acid and propylene glycol, said liquid polyester being terminated by butyl Cellosolve, based on the weight of the polyvinyl butyral, and
(C) 0.5 to 60 percent of sucrose benzoate, based on the weight of the polyvinyl butyral.

16. A glass laminate wherein the glass sheets are bonded by a composition of matter comprising a polyvinyl acetal resin containing:
(A) At least one non-polymeric ester having a boiling point greater than 175° C., selected from the group consisting of partial and full esters of (1) an alcohol containing at least one hydroxyl group and (2) an acid containing at least one carboxyl group,
(B) At least one liquid polyester having a molecular weight in the range of 300 to 50,000 and which is the coreaction product of a polybasic acid and a polyhydric alcohol, and
(C) At least one ester which is the coreaction product of a disaccharide and at least one organic carboxylic acid, containing from 1 to 10 carbon atoms.

17. A laminate as set forth in claim 16 wherein the polyvinyl acetal resin is polyvinyl butyral.

18. A glass laminate wherein the glass sheets are bonded by a composition of matter comprising a polyvinyl butyral containing:
(A) 1 to 95 percent, based on the weight of the polyvinyl butyral, of at least one non-polymeric ester having a boiling point greater than 175° C., selected from the group consisting of partial or full esters of (1) an alcohol containing at least one hydroxyl group and (2) an acid containing at least one carboxyl group,
(B) 0.5 to 20 percent, based on the weight of the polyvinyl butyral, of at least one liquid polyester having a molecular weight in the range of 300 to 50,000 and which is the coreaction product of a polyhydric alcohol and a polybasic acid, and
(C) 0.5 to 60 percent, based on the weight of the polyvinyl butyral, of at least one ester which is the coreaction product of a disaccharide and at least one organic carboxylic acid, containing from 1 to 10 carbon atoms.

19. A glass laminate wherein the glass sheets are bonded by a composition of matter comprising a polyvinyl acetal containing:
(A) 1 to 95 percent of triethylene glycol di(2-ethyl butyrate) based on the weight of the polyvinyl acetal,
(B) 0.5 to 20 percent of a polyester of diglycolic acid and propylene glycol, said polyester being terminated by butyl Cellosolve and having a molecular weight in the range of 800 to 8,000 based on the weight of the polyvinyl acetal, and
(C) 0.5 to 60 percent of sucrose benzoate, based on the weight of the polyvinyl acetal.

20. A plasticizer composition comprising:
(A) At least one non-polymeric ester having a boiling point greater than 175° C., selected from the group consisting of partial and full esters of (1) an alcohol containing at least one hydroxyl group and (2) an acid containing at least one carboxyl group,
(B) At least one liquid polyester having a molecular weight in the range of 300 to 50,000 and which is the coreaction product of a polybasic acid and a polyhydric alcohol, and
(C) At least one ester which is the coreaction product of a disaccharide and at least one organic carboxylic acid, containing from 1 to 10 carbon atoms.

21. A plasticizer composition comprising:
(A) 1 to 95 percent, based on the total weight of the plasticizer composition, of at least one non-polymeric ester having a boiling point greater than 175° C., selected from the group consisting of partial or full esters of (1) an alcohol containing at least one hydroxyl group and (2) an acid containing at least one carboxyl group,
(B) 0.5 to 20 percent, based on the total weight of the plasticizer composition, of at least one liquid polyester having a molecular weight in the range of 300 to 50,000 and which is the coreaction product of a polyhydric alcohol and a polybasic acid, and
(C) 0.5 to 60 percent, based on the total weght of the plasticizer composition, of at least one ester which is the coreaction product of a disaccharide and at least one organic carboxylic acid, containing from 1 to 10 carbon atoms.

22. A plasticizer composition comprising:
(A) 1 to 95 percent of triethylene glycol di(2-ethyl butyrate) based on the total weight of plasticizer composition,
(B) 0.5 to 20 percent of a polyester of diglycolic acid and propylene glycol, said liquid polyester being terminated by butyl Cellosolve, based on the total weight of plasticizer composition, and
(C) 0.5 to 60 percent of sucrose benzoate based on the total weight of plasticizer composition.

No references cited.

WILLIAM H. SHORT, *Primary Examiner.*

J. NORRIS, *Assistant Examiner.*